Figure 1:
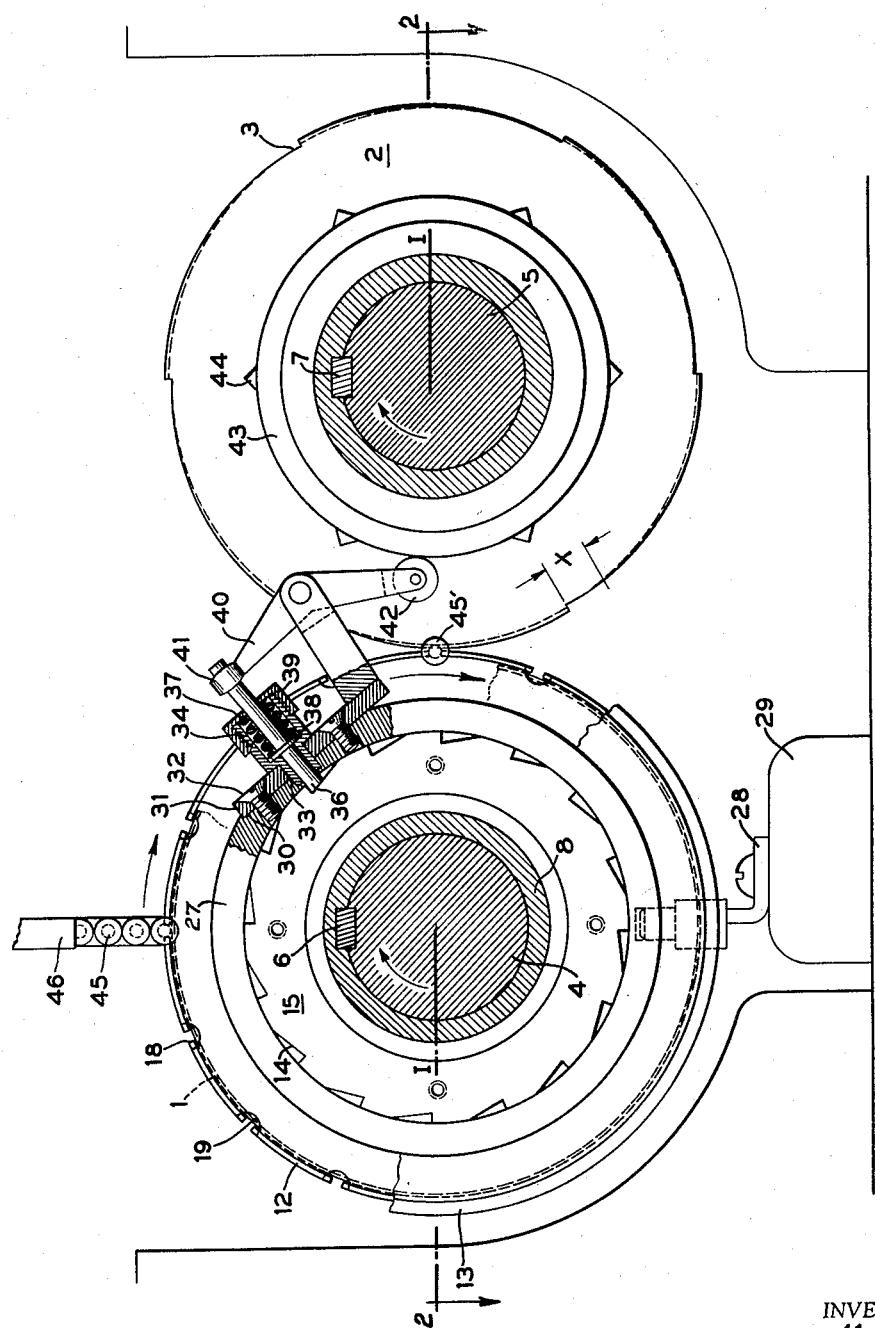

Oct. 27, 1959 E. F. W. MOELTZNER 2,909,952
APPARATUS FOR FEEDING AND ROLLING WORKPIECES
Filed June 24, 1953 2 Sheets-Sheet 1

INVENTOR
*Ernst Fritz Wilhelm Moeltzner*

BY *Strauch, Nolan & Diggins*

ATTORNEYS

Oct. 27, 1959  E. F. W. MOELTZNER  2,909,952
APPARATUS FOR FEEDING AND ROLLING WORKPIECES
Filed June 24, 1953  2 Sheets-Sheet 2

INVENTOR
ERNST FRITZ WILHELM MOELTZNER

BY Strauch, Nolan & Diggins
ATTORNEYS

United States Patent Office 2,909,952
Patented Oct. 27, 1959

2,909,952
APPARATUS FOR FEEDING AND ROLLING WORKPIECES

Ernst Fritz Wilhelm Moeltzner, Berlin-Charlottenburg, Germany, assignor, by mesne assignments, to Landis Machine Company, Waynesboro, Pa., a corporation of Pennsylvania Application June 24, 1953, Serial No. 363,729

2 Claims. (Cl. 80—6)

Mechanisms for rolling threads or other profiles are known, in which two rolling tools rotating in the same direction, threading rolls for example, are provided, one of which tools is stationarily mounted in the machine frame and the other is mounted on a slide. The rolling tools are cylindrical rolls, which have on their circumferential surfaces the mirror profile of the work piece to be rolled and which are moved toward each other during the rolling operation. The work piece lies upon a work rest between the rolls. These known rolling mechanisms make possible only a small production of finish rolled work pieces, since each work piece must be placed on the work rest before rolling, then rolled, and after rolling must again be removed from the work rest.

There are also known mechanisms for feeding and removing work pieces, which carry the work piece to be rolled from a magazine to the work rest and which remove it therefrom after rolling. By this means the insertion and removal of work pieces by hand is avoided. However, the production is not appreciably improved.

It has also previously been proposed to provide one or both rolls with spirally rising rolling segments. It is possible either for two such rolling tools to work together or for a cylindrical roll to work with one provided with profile segments. The depth of penetration, which otherwise resides in the slide movement, is placed in the rise of the profile segments, so that, in these known mechanisms, both rolling tools are mounted in the machine frame at a fixed distance between their axes. The length of a profile segment must correspond to the rolling path necessary for rolling the work piece. In this way one or more work pieces are rolled in each rotation of the rolling tool, depending upon the number of profile segments provided on one roll. These rolling mechanisms are particularly adaptable to work pieces of small diameter. For example, the threads on screws up to M12 can be rolled with them.

Particular difficulty is encountered in the feeding of these small screws. For this reason, carriers have previously been provided for these mechanisms which are made in the form of recesses in both rolls. When the roll is rotated beneath a magazine, the work pieces fall successively into these recesses and are transported by the roll itself to the working position, where they are rolled and afterwards enter the recesses in the other roll, which carries them away from the working position and ejects them. The rolls necessary for this operation are manufactured specially. They are consequently expensive and have the disadvantage that they can be used for definite work piece dimensions which correspond to the dimensions of the recesses. Short work pieces, for example, cap screws with an M5 or smaller thread, have a heavy head and, during the continuous passage of the recesses beneath the magazine, cannot be carried away without jamming.

The present invention avoids these disadvantages through the use of a rotating transfer cylinder, which rotates independently of the rolls, goes through the rolling space between the two rolls and is provided on its circumference with transfer means in the form of recesses. For rolling small screws in rapid succession, a suitably controlled reciprocation of the slide is much too slow. Furthermore, as will be seen from the invention, it is important that these small work pieces be introduced into a rolling space of constant size and that they be conveyed laterally between the two rolls. In this aspect the invention combines with a basically different method of rolling such small work pieces and employs as rolling tools those with spirally rising profile segments, whereby the conveyance of the work piece is effected by the transfer cylinder, which serves as a work rest in the operating position of the work piece.

Accordingly, the invention resides in the fact that a locking mechanism locks a transfer cylinder from the beginning to the end of the rolling path of each profile segment; said transfer cylinder being provided with carriers greater in number than the number of profile segments arranged on the circumference of one roll, mounted concentric with the other roll, driven therefrom by a friction drive and said transfer cylinder with the work piece fed thereby passing through the rolling space between the rolls; said locking mechanism releasing the lock for a short time between two successive rolling paths.

For this purpose a control disc is secured upon the operating shaft of the roll which is provided with profile segments. The number of cams on the control disk is equal to the number of profile segments. On the operating shaft of the other roll, a ratchet wheel, provided with teeth corresponding in number to the carriers in the transfer cylinder, is mounted independently of this roll and is connected to the transfer cylinder. A two-armed locking lever carries, on one side, a roller which lies in contact with the control disc and, on the other side, the lever is connected to a locking pin which engages the teeth of the ratchet wheel.

For trouble-free operation of this mechanism it is important that the ratchet wheel be covered to prevent the entrance of dirt into the locking teeth and faulty indexing. Consequently, a further portion of the invention resides in the fact that the ratchet wheel is surrounded by a ring carrying the locking mechanism, which ring is secured to the machine frame by means of a bracket.

It is important to the invention that the transfer cylinder should have a greater number of carriers than there are cams arranged on the control disc. Since the number of recesses in the transfer cylinder must agree with the number of teeth on the ratchet wheel, the limit of the number of recesses in the transfer cylinder depends upon the form of the ratchet wheel. For example, 16 or more recesses may be formed in the transfer cylinder while the control disc may have only six cams and the roll may have six corresponding rolling segments distributed on its circumference. This large number of recesses has the advantage that the transfer cylinder, after release of the lock, has only a short path to travel to bring a new work piece into operating position. Consequently the blank space which must be provided between two rolling surfaces for this movement of the transfer cylinder can also be small, so that practically no rolling surface is lost on the circumference of the roll.

The mechanism according to the invention is particularly suitable for rolling small cap screws with an M2.5 thread, for example, the screws being automatically fed and discharged. As many work pieces are rolled in one revolution of the roll as there are profile segments provided on the circumference.

A further advantage resides in the fact that the rolls, the transfer cylinder and the control disc with the locking mechanism, without anything further, are to be used on standard thread rolling machines whose drive shafts lie in a horizontal plane. The slide carrying one roll is set to the width of the rolling space between the rolls and is secured in this position. A thread rolling machine of this kind operates fully automatically with the simplest means.

Figure 2:
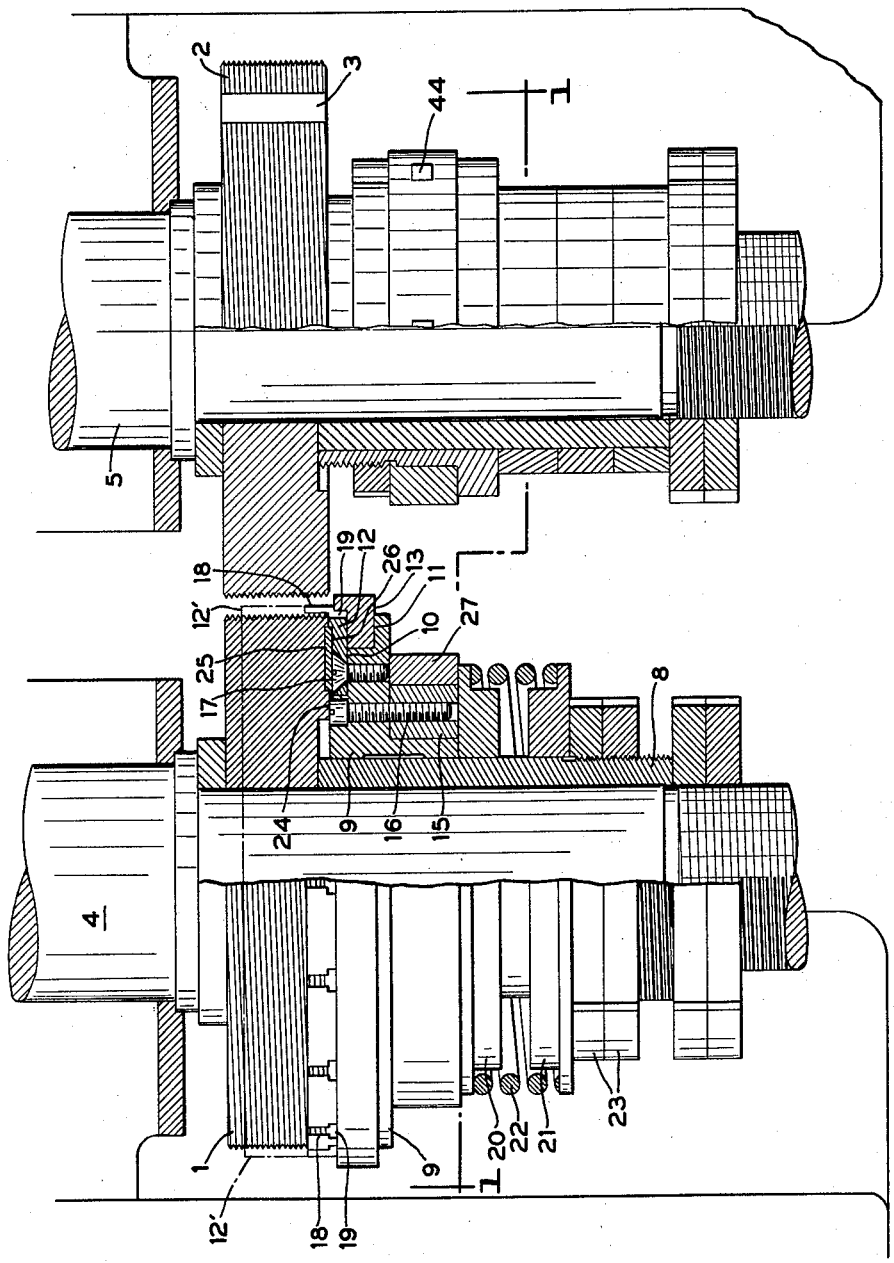

The subject matter of the invention is shown in the drawing in an exemplary embodiment. In the drawings:

Fig. 1 shows two rolling tools positioned at a fixed distance apart axially, with a transfer cylinder and a locking mechanism operated by a control disc, in elevation and partially in section taken along line 1—1 of Figure 2 and Fig. 2 is a plan view of the rolling tools of Fig. 1, partially in section taken along line 2—2 of Figure 1.

In the exemplary embodiment shown, the left-hand roll 1 is formed cylindrically and the right-hand roll 2 is provided with six profile segments 3 arranged evenly about the circumference. Roll 1 is mounted on the operating shaft 4 and roll 2 on operating shaft 5. Both rolls are driven in the same direction of rotation and rotate clockwise, as shown by the arrow. Unitary rotation of rolls and operating shafts is effected by keys 6 and 7.

The flange 9, having annularly cut-way portions 10 and 11 is rotatably journalled on the sleeve 8, which is mounted on spindle 4. In the cut-away portion 10 is seated the transfer cylinder 12 in the form of a flanged plate and an abutting ring 13 is mounted in portion 11. A ratchet wheel 15, provided with ratchet teeth 14, is secured to the flange 9 by screws 16. The transfer cylinder is secured by screws 17. In this manner, the flange 9, the transfer cylinder 12, abutting ring 13 and ratchet wheel 15 form a unit.

The transfer cylinder is rotatable relative to roll 1 and can easily be replaced. It has, on its circumference, axially directed recesses 18 which have a width greater than the diameter of the finish-rolled work piece. For transferring cap screws, the recesses 18 have clearance notches 19, which are enclosed by the abutting ring 13. The cylindrical portion of the transfer cylinder 12, which contains the recesses 18, projects as far over the roll as the length of the work piece to be rolled requires, because the work piece should be positively guided and should be in contact along its full length when it is rolled. The transfer cylinder with a wider cylindrical portion is shown in broken lines in Figure 2 and designated 12'.

Also mounted on the sleeve 8 are the compression rings 20 and 21 between which is located a strong compression spring 22. The outer ring 21 is retained by the nuts 23. The inner ring 20 presses the flange 9 with the transfer cylinder against the inner end surface 24 of the roll 1, whereby this acts as a friction surface and carries the transfer cylinder along when the cylinder is not locked. It may be appropriate to mount a clutch disc 25 between the roll 1 and the bottom of the transfer cylinder, as shown in the upper half of Fig. 2.

The ratchet wheel 15 is covered by the ring 27 which is secured to the machine frame 29 by the bracket 28. This ring has a flattened portion 30 for mounting the bearing block 31 by means of screws 32. A spring housing 34 is pressed into a bore 33 in the bearing block 31 or is soldered thereto. The spring housing 34 serves to guide the locking pin 36 and carries the compression spring 37 which presses at one end against the shoulder 38 of the locking pin and at the other end against the threaded cover 39 of the spring housing. The locking pin 36 engages the teeth 14 of the ratchet wheel and locks the same. Externally of the spring housing the locking pin is connected in a two-armed locking lever 40 which has a fork 41 for this purpose. The other arm of lever 40 carries the roller 42. The locking mechanism is arranged on the ring 27 in such a way that the two-armed lever is positioned with the roller 42 on the control disk 43, which is located in front of the segmented roll 2 and is secured on operating shaft 5.

The control disk 43 has cams 44, the number of which corresponds to the number of the profile segments 3 and which are so arranged that a cam will raise the roller 42 and release the lock when the rolling operation is completed and the blank portion designated $x$ is passing the working position prior to the start of a new rolling operation.

Feeding of the work pieces designated by 45 is effected by the magazine 46 which has an opening above the transfer cylinder 12 and is so arranged as to stand directly above a recess 18 when the transfer cylinder is locked. The magazine 46 should be accurately positioned on the vertical axis of the transfer cylinder.

The control disk 43, together with the roll 2, can easily be exchanged. Obviously, it is also possible to use two rolls provided with profile segments. It is also possible to alter the locking mechanism structurally.

The manner of operation is as follows:

If the transfer cylinder is locked by the locking mechanism, the work piece designated 45' is located exactly in the working position between rolls 1 and 2, while a new work piece 45 has fallen into a recess 18 of the transfer cylinder. At the end of the rolling operation the profile segment 3 has passed so that the short blank space $x$ follows. At this instant the roller 42 is raised by the cam 44, whereby the locking pin 36 is lifted out of the tooth 14 of the ratchet wheel 15, so that the transfer cylinder rotates as a result of the operation of the compression spring 22 on its friction surface until the locking pin falls into the next tooth 14. In this brief rotary movement of the transfer cylinder a new work piece has been brought into working position and during the stationary period now to follow, the next work piece falls into the next succeeding recess 18. A new work piece is carried along in each rotative step of the transfer cylinder, a new work piece is brought into working position and a completely rolled work piece is discharged so that continuous production results.

I claim:

1. Apparatus for rolling workpieces comprising a pair of forming rolls, one of said rolls having a plurality of eccentric forming segments, means for rotating said rolls, a transfer cylinder surrounding the other of said rolls, a friction drive for constantly urging said cylinder in a direction to transfer successive workpieces from a magazine to a forming position between said rolls, an indexing plate rigidly secured to said transfer cylinder, a fixed ring surrounding said indexing plate, an indexing lever pivotally mounted on said fixed ring, cooperating means on one end of said lever and said indexing plate adapted, when engaged, to lock said plate and said transfer cylinder against rotation, means resiliently urging said indexing lever into locking engagement with said indexing plate, a control disk mounted for rotation with said one of said rolls, a plurality of cams on said control disk, the number of cams being equal to the number of said eccentric work forming segments, and means on the opposite end of said indexing lever engageable with said cams when the trailing edge of said segments passes said forming position to move said one end of said lever out of engagement with said indexing plate to permit rotation of said indexing plate and said transfer cylinder.

2. Apparatus for rolling workpieces comprising a frame, a pair of forming rolls, one of said rolls having a plurality of eccentric forming segments, means on said frame for supporting said rolls for rotation about parallel axes, means for rotating said rolls, a transfer cylinder closely surrounding and concentric with the other of said rolls, a friction drive for constantly urging said transfer cylinder in a direction to transfer successive workpieces from a magazine to a forming position between said rolls, an indexing member rigid with said transfer cylinder, an indexing lever, means rigid with said frame supporting said indexing lever for pivotal movement about a fixed axis adjacent said indexing member, cooperating means on one end of said lever and said indexing member adapted, when engaged, to lock said member and said transfer cylinder against rotation, means resiliently urging said indexing lever into locking engagement with said indexing member, an annular control member mounted for rotation with said rolls and concentrically of said one roll, a plurality of cams on said control member, said cams being equally spaced around the periphery of said annular control member, the number of cams being equal to the number of said eccentric work forming segments, and cam follower means on the opposite end of said indexing lever momentarily engageable with said cams when the trailing edge of said segments pass said forming position to move said one end of said lever momentarily out of engagement with said indexing member to permit rotation of said indexing member and said transfer cylinder.

References Cited in the file of this patent

UNITED STATES PATENTS

| | | | |
|---|---|---|---|
| 622,475 | Hubbell | Apr. 4, | 1899 |
| 917,269 | Eden | Apr. 6, | 1909 |
| 1,017,881 | Landis | Feb. 20, | 1912 |
| 1,107,621 | Landis | Aug. 18, | 1914 |
| 1,132,698 | Wilcox | Mar. 23, | 1915 |
| 1,384,585 | Barany | July 12, | 1921 |
| 2,048,265 | Hatebur | July 21, | 1936 |
| 2,309,126 | Lundius | Jan. 26, | 1943 |
| 2,439,225 | Scrivener | Apr. 6, | 1948 |

FOREIGN PATENTS

| | | | |
|---|---|---|---|
| 495,407 | Belgium | Aug. 16, | 1950 |
| 635,564 | Great Britain | Apr. 12, | 1950 |